Patented Mar. 23, 1954

2,673,190

UNITED STATES PATENT OFFICE 2,673,190

COMPOSITIONS CAPABLE OF HARDENING RAPIDLY IN THE COLD TO YIELD CHEMICALLY RESISTANT MASSES, AND CONTAINING PHENOL - FORMALDEHYDE RESINS, AND A PROCESS OF PREPARING SAID COMPOSITIONS

Karl Dietz, Kronberg (Taunus), Germany, assignor to Farbwerke Hoechst Aktiengesellschaft vormals Meister Lucius und Brüning, Frankfurt am Main Hochst, Germany, a company of Germany No Drawing. Application September 23, 1950, Serial No. 186,498

Claims priority, application Germany October 17, 1949

10 Claims. (Cl. 260—38)

The present invention relates to compositions capable of hardening rapidly in the cold to yield chemically resistant masses, and containing phenol-formaldehyde resins, and to a process of preparing said compositions.

It has already been proposed to prepare compositions containing phenol-aldehyde condensation products which harden rapidly in the cold, by mixing a phenol-aldehyde condensation product which has been condensed in an alkaline medium only to such a degree that it is still in the liquid state, with a very wide variety of hardening agents and, if desired, with a filler. Moreover, it is known to increase the chemical resistance of such products by the addition of, for instance, halogenated aliphatic alcohols or aldehydes or aliphatic esters of inorganic acids. Since these additions have no hardening action on the condensation products, it is necessary to add a known hardening agent. It is, however, also known to enhance the chemical resistance of such products by the addition of arylalkyl compounds acting simultaneously as hardening agents.

Now, I have found that compositions capable of hardening rapidly in the cold to yield chemically resistant masses can be obtained by mixing a cement powder containing a hardener and a filler with a liquid consisting of furfurol and a still liquid condensation product obtained by condensing formaldehyde with a mononuclear monohydric phenol in the presence of an alkaline catalyst. The hardened masses obtained from these compositions are highly resistant especially to alkalies, oxidizing agents and organic solvents, while their stability to acids and water is in no way impaired. In particular their stability to organic solvents, such as ethyl acetate, acetone and alcohol, is materially increased. The proportion of furfurol added to the liquid phenol-formaldehyde condensation product may vary within wide limits. It is of special advantage to use a proportion of furfurol ranging from about 10 to about 90 per cent, and preferably from about 20 to about 50 per cent, calculated on the weight of the condensation product used.

For the preparation of the condensation product it is of advantage to use the formaldehyde and phenol in molecular ratios ranging from about 1:1 to about 1.8:1. Especially advantageous are ratios ranging from about 1.4:1 to about 1.8:1. As phenols there may be used the phenol itself ($C_6H_5OH$), the various isomeric cresols and xylenols, or mixtures of several or all of these compounds above all commercial mixtures of cresols or of xylenols. The method of carrying out the alkaline condensation to form such condensation products is in itself known. For instance, it may be carried out as follows:

55 parts by weight of phenol are introduced into 14 parts by weight of a caustic soda solution of 42 per cent strength at about 60–70° C. After cooling to about 35–40° C., 100 parts by weight of a formaldehyde solution of 30 per cent strength are run in, and the whole is maintained at this temperature for about 2–3 days. The whole is then neutralized by the addition of 34 parts by weight of crude hydrochloric acid of 20 per cent strength, while cooling with ice, the temperature not being allowed substantially to exceed about 40° C. After 3 hours, the weakly acid mixture is allowed to separate into layers, the resin layer is washed with water, while stirring and renewed separating into layers, and the mixture is adjusted to a pH of 7–8 by the addition of caustic soda solution.

As hardening agents for preparing the cement powder substances known to be suitable for this purpose may be used either alone or in mixture with each other, for instance, acid or normal persulfates; titanium sulfate; metal dioxides having a neutral reaction with respect to water, such as lead peroxide, manganese dioxide in solid form; aromatic sulfochlorides such as para-toluene sulfochloride, beta-naphthalene sulfochloride; or aralkyl chlorides, aralkyl sulfates or naphthalene disulfonic acids.

As fillers there are used the usual inert substances either alone or mixed with each other, for instance, quartz powder, barium sulphate, and especially substances having a good thermal conductivity, for instance, natural or artificial graphite, silicon, silicon compounds such as silicon carbide or the like.

The cement powder is prepared by simply mixing the hardeners with the inert fillers, and then mixing the whole with a liquid.

This liquid consists of furfurol and a still liquid condensation product (obtained in the presence of an alkaline catalyst in known manner) from formaldehyde and at least one of the above mentioned phenols. The liquid may be prepared by simply mixing, for instance, about 20 parts by weight of furfurol with about 100 parts by weight of a still liquid phenol-formaldehyde condensation product made with the aid of an alkaline catalyst and, for instance, by using formaldehyde and phenol ($C_6H_5OH$) in a ratio of about 1.6:1.

For some purposes it is advantageous, for the further treatment and for enhancing the chemical resistance, to heat the mixture of furfurol and condensation product before use. The heating is effected, for instance, under reflux and for about 1–2 hours; but the period may be shorter or longer, depending on the nature of the condensation product and the quantity used.

The period is so chosen that hardening does not occur during the heating, and that merely a further condensation of the mixture takes place in which the furfurol participates.

According to the intended use of the cement, it is advantageous in some cases to use, besides furfurol, other substances increasing the chemical resistance of the hardened phenol-formaldehyde resin mixture. These substances may be added either alone or in admixture. The proportion thereof may vary within wide limits. In general, however, proportions of about 5–10 per cent by weight, calculated on the resin yield good results. Higher proportions, for instance, about 25 per cent may be used. Such substances are, for instance, the known aliphatic esters of inorganic acids, and the also known chlorinated aliphatic alcohols or aldehydes such, for instance, as 1:3-dichloropropanol or epichlorohydrin. There may also be used with advantage phenoxy-compounds obtained by the reaction of phenol, the isomeric cresols and xylenols or other homologues with dichlorhydrin or epichlorhydrin by heating equimolecular proportions of these reactants under reflux with addition of caustic alkali and distilling off in vacuo.

As aliphatic esters of inorganic acids there may be mentioned, for instance, alkyl sulfates such as diethyl sulfate or dipropyl sulfate, dibenzyl sulfate, triethyl phosphate, dichlorpropanol, epichlorhydrin, dichlorhydrin and ethylene chlorhydrin.

Instead of or in addition to these substances, chlorinated aliphatic alcohols or aldehydes may be used, for instance, ortho-chlorobenzaldehyde, β-dichlorpropionaldehyde hydrate, chloral hydrate or the like.

Self-hardening chemically-resistant masses are prepared, for example, by first mixing one or more of the aforesaid hardeners with one or more of the aforesaid fillers. The mixed powder is then made into a paste with a liquid comprising furfurol and a liquid condensation product of a resin made from formaldehyde and at least one mononuclear monohydric phenol.

The following examples serve to illustrate the invention but they are not intended to limit it thereto, the parts being by weight:

Example 1

100 parts of a still liquid phenol-formaldehyde condensation product produced by alkaline condensation from formaldehyde and phenol in the molecular ratio of 1.4:1, are mixed with 10 parts of glycol chlorhydrin, and 20 parts of furfurol are then added. The mixture is used for making a paste with a cement powder consisting of 90 parts of barium sulfate and 10 parts of para-toluene-sulfochloride. 100 parts of the cement powder are required for about 30 parts of the above mentioned liquid.

Example 2

100 parts of a still liquid phenol-formaldehyde condensation product, produced by alkaline condensation from formaldehyde and phenol in the molecular ratio of 1.5:1, are mixed with 10 parts of epichlorhydrin, and 40 parts of furfurol are then added. The mixture is heated under reflux for 1 hour, no hardening taking place. After cooling, the reaction product is used for making a paste with a cement powder consisting of 90 parts of artificial graphite powder, 5 parts of paratoluene sulfochloride and 5 parts of 1,5-naphthalene disulfonic acid. With 100 parts of the cement powder about 80 parts of the liquid are required.

Example 3

100 parts of a still liquid phenol-formaldehyde condensation product produced by alkaline condensation from formaldehyde and phenol in the molecular ratio of 1.6:1, are mixed with 10 parts of the phenoxy-compound obtained by reacting phenol or cresol with dichlorhydrin in an alkaline medium, and 40 parts of furfurol are then added. The mixture is heated for 2 hours under reflux, no hardening taking place. The phenoxy-compound may also be added after the heating. After cooling, the reaction product is used for making a paste with a cement powder consisting of 90 parts of artificial graphite powder, 5 parts of para-toluene sulfochloride and 5 parts of 1,5-naphthalene disulfonic acid. With 100 parts of the cement powder about 80 parts of the liquid are required.

Example 4

100 parts of a still liquid cresol-formaldehyde condensation product produced by alkaline condensation from formaldehyde and meta-cresol in a molecular ratio of 1.5:1, are mixed with 50 parts of furfurol. The mixture is heated for 2 hours under reflux, no hardening taking place. After cooling, the reaction mixture is used for making a paste with a cement powder consisting of 90 parts of an artificial graphite powder, 5 parts of paratoluene sulfochloride and 5 parts 1,5-naphthalene-disulfonic acid. With 100 parts of the cement powder about 80 parts of the liquid are required.

Example 5

100 parts of a still liquid condensation product, produced by alkaline condensation from formaldehyde and a commercial xylenol mixture in the molecular ratio of 1.2:1, are mixed with 10 parts of furfurol and 5 parts of epichlorhydrin. The mixture is heated for 2 hours at 100° C., no hardening taking place. The liquid mixture is used for making a paste with a cement powder consisting of 93 parts of graphite powder or electrode carbon powder and 7 parts of 1,5-naphthalene-disulfonic acid, 5 parts of cement powder being used for every 4 parts of resin mixture.

Example 6

100 parts of a still liquid condensation product, produced by alkaline condensation from formaldehyde and phenol ($C_6H_5OH$) in the molecular ratio of 1.8:1, are mixed with about 40 parts of furfurol, and the mixture is heated for about 1½ hours under reflux. After cooling the reaction product is used for making a paste with a cement powder consisting of 45 parts of quartz powder, 40 parts of graphite powder, 7.5 parts of para-toluene sulfochloride and 7.5 parts of 1,5-naphthalene-disulfonic acid. With 100 parts of the cement powder about 75 parts of the liquid are required.

I claim:

1. A composition capable of hardening rapidly in the cold to yield chemically resistant masses, comprising an inert filler, a hardening agent, a still liquid resin obtained by condensing formaldehyde and phenol in the molecular proportion ranging from about 1:1 to about 1.8:1 in an alkaline medium; a compound selected from the group consisting of diethyl sulfate, dipropyl sulfate, dibenzyl sulfate, triethyl phosphate, 1,3-dichloropropanol, epichlorhydrin, dichlorhydrin, ethylene chlorhydrin, said compound being present in an amount ranging from about 5 per cent. to about 25 per cent., calculated upon the amount of the resin used; and furfurol in an amount ranging from about 10 per cent. to about 90 per cent., calculated upon the amount of the resin used.

2. A composition capable of hardening rapidly in the cold to yield chemically resistant masses, comprising graphite powder as a filling agent; a hardening agent, a still liquid resin obtained by condensing formaldehyde and phenol in the molecular proportion ranging from about 1:1 to about 1.8:1 in an alkaline medium; a compound selected from the group consisting of diethyl sulfate, dipropyl sulfate, dibenzyl sulfate, triethyl phosphate, 1,3-dichloropropanol, epichlorhydrin, dichlorhydrin, ethylene chlorhydrin, said compound being present in an amount ranging from about 5 per cent. to about 25 per cent., calculated upon the amount of the resin used; and furfurol in an amount ranging from about 10 per cent. to about 90 per cent., calculated upon the amount of the resin used.

3. A composition capable of hardening rapidly in the cold to yield chemically resistant masses, comprising graphite powder as a filling agent; 1,5-naphthalene-disulfonic acid as a hardening agent, a still liquid resin obtained by condensing formaldehyde and phenol in the molecular proportion ranging from about 1:1 to about 1.8:1 in an alkaline medium; a compound selected from the group consisting of diethyl sulfate, dipropyl sulfate, dibenzyl sulfate, triethyl phosphate, 1,3-dichloropropanol, epichlorhydrin, dichlorhydrin, ethylene chlorhydrin, said compound being present in an amount ranging from about 5 per cent. to about 25 per cent., calculated upon the amount of the resin used; and furfurol in an amount ranging from about 10 per cent. to about 90 per cent., calculated upon the amount of the resin used.

4. A composition capable of hardening rapidly in the cold to yield chemically resistant masses, comprising graphite powder as a filling agent; 1,5-naphthalene-disulfonic acid and para-toluene-sulfochloride as a hardening agent, a still liquid resin obtained by condensing formaldehyde and phenol in the molecular proportion ranging from about 1:1 to about 1.8:1 in an alkaline medium; a compound selected from the group consisting of diethyl sulfate, dipropyl sulfate, dibenzyl sulfate, triethyl phosphate, 1,3-dichloropropanol, epichlorhydrin, dichlorhydrin, ethylene chlorhydrin, said compound being present in an amount ranging from about 5 per cent. to about 25 per cent., calculated upon the amount of the resin used; and furfurol in an amount ranging from about 10 per cent. to about 90 per cent., calculated upon the amount of the resin used.

5. A composition capable of hardening rapidly in the cold to yield chemically resistant masses, comprising graphite powder; a hardening agent; a still liquid resin obtained by condensing formaldehyde and phenol in the molecular proportion ranging from about 1:1 to about 1.8:1 in an alkaline medium; epichlorhydrin in an amount ranging from about 5 per cent. to about 25 per cent. calculated upon the amount of the resin used; and furfurol in an amount ranging from about 10 per cent. to about 90 per cent., calculated upon the amount of the resin used.

6. A composition capable of hardening rapidly in the cold to yield chemically resistant masses, comprising graphite powder as a filling agent; a hardening agent, a still liquid resin obtained by condensing formaldehyde and phenol in the molecular proportion ranging from about 1:1 to about 1.8:1 in an alkaline medium; a compound selected from the group consisting of diethyl sulfate, dipropyl sulfate, dibenzyl sulfate, triethyl phosphate, 1,3-dichloropropanol, epichlorhydrin, dichlorhydrin, ethylene chlorhydrin, said compound being present in an amount ranging from about 5 per cent. to about 25 per cent., calculated upon the amount of the resin used; and furfurol in an amount ranging from about 20 per cent. to about 50 per cent., calculated upon the amount of the resin used.

7. A composition capable of hardening rapidly in the cold to yield chemically resistant masses, comprising graphite powder; a hardening agent, a still liquid resin obtained by condensing formaldehyde and phenol in the molecular proportion ranging from about 1:1 to about 1.8:1 in an alkaline medium; epichlorhydrin in an amount ranging from about 5 per cent. to about 25 per cent., calculated upon the amount of the resin used; and furfurol in an amount ranging from about 20 per cent. to about 50 per cent., calculated upon the amount of the resin used.

8. A process of preparing a composition capable of hardening rapidly in the cold to yield a chemically resistant mass, which comprises mixing an inert filler with a hardening agent and mixing the cement powder thus formed with a liquid containing furfurol, a compound selected from the group consisting of diethyl sulfate, dipropyl sulfate, dibenzyl sulfate, triethyl phosphate, 1,3-dichloropropanol, epichlorhydrin, dichlorhydrin, ethylene chlorhydrin; and a still liquid resin obtained by condensation of formaldehyde and phenol in the molecular proportion ranging from about 1:1 to about 1.8:1 in an alkaline medium, the furfurol being present in an amount ranging from about 10 per cent. to about 90 per cent. of the resin used.

9. A process of preparing a composition capable of hardening rapidly in the cold to yield a chemically resistant mass, which comprises mixing graphite powder with 1,5-naphthalene-disulfonic acid and mixing the cement powder thus formed with a liquid containing furfurol, epichlorhydrin and a still liquid resin obtained by condensing formaldehyde and phenol in the molecular proportion ranging from about 1:1 to about 1.8:1 in an alkaline medium, the furfurol being present in an amount ranging from about 10 per cent. to about 90 per cent. of the resin used.

10. A process of preparing a composition capable of hardening rapidly in the cold to yield a chemically resistant mass, which comprises mixing graphite powder with a hardening agent, and mixing the cement powder thus formed with a liquid containing furfurol, a compound selected from the group consisting of diethyl sulfate, dipropyl sulfate, dibenzyl sulfate, triethyl phosphate, 1,3-dichloropropanol, epichlorhydrin, dichlorhydrin, ethylene chlorhydrin; and a still liquid resin obtained by condensing formaldehyde and phenol in the molecular proportion ranging from about 1:1 to about 1.8:1 in an alkaline medium, the furfurol being present in an amount ranging from about 20 per cent. to about 50 per cent. of the resin used.

KARL DIETZ.

References Cited in the file of this patent

UNITED STATES PATENTS

| Number | Name | Date |
| --- | --- | --- |
| 1,720,895 | Groff et al. | July 16, 1929 |
| 1,884,747 | Knapp | Oct. 25, 1932 |
| 2,103,768 | Dietz | Dec. 28, 1937 |
| 2,258,546 | Dietz | Oct. 7, 1941 |

FOREIGN PATENTS

| Number | Country | Date |
| --- | --- | --- |
| 595,288 | Great Britain | Dec. 1, 1947 |
| 627,717 | Great Britain | Aug. 15, 1949 |